(12) United States Patent
Ng

(10) Patent No.: US 8,605,063 B2
(45) Date of Patent: Dec. 10, 2013

(54) DEVICE LIGHTING APPARATUS AND METHOD

(75) Inventor: Chern Ann Ng, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 749 days.

(21) Appl. No.: 12/281,266

(22) PCT Filed: Aug. 30, 2007

(86) PCT No.: PCT/SG2007/000285
§ 371 (c)(1),
(2), (4) Date: Jul. 23, 2010

(87) PCT Pub. No.: WO2009/029047
PCT Pub. Date: Mar. 5, 2009

(65) Prior Publication Data
US 2010/0283405 A1    Nov. 11, 2010

(51) Int. Cl.
*G09G 5/00* (2006.01)

(52) U.S. Cl.
USPC .......................................... 345/204

(58) Field of Classification Search
USPC ......... 315/291, 246, 307, 292, 293, 294, 312;
345/156, 158, 168, 169, 170, 172, 204, 345/207
See application file for complete search history.

(56) References Cited

U.S. PATENT DOCUMENTS

| | | | |
|---|---|---|---|
| 6,548,967 B1* | 4/2003 | Dowling et al. | 315/318 |
| 2007/0132720 A1* | 6/2007 | Kang | 345/156 |
| 2007/0139316 A1* | 6/2007 | Hyatt | 345/82 |
| 2007/0155312 A1* | 7/2007 | Goldberg et al. | 455/3.06 |

* cited by examiner

*Primary Examiner* — Minh D A
(74) *Attorney, Agent, or Firm* — McDonnell Boehnen Hulbert & Berghoff LLP

(57) ABSTRACT

In accordance with embodiments of the invention, an apparatus and method for device lighting is disclosed. The apparatus and method comprises a key operable for communicating with a computing device. The apparatus further comprises a light emitting device for lighting the key and a selector operable for selecting between a plurality of lighting schemes. More specifically, each of the plurality of lighting schemes defines at least one of color, intensity and duration of the lighting of the key.

26 Claims, 3 Drawing Sheets

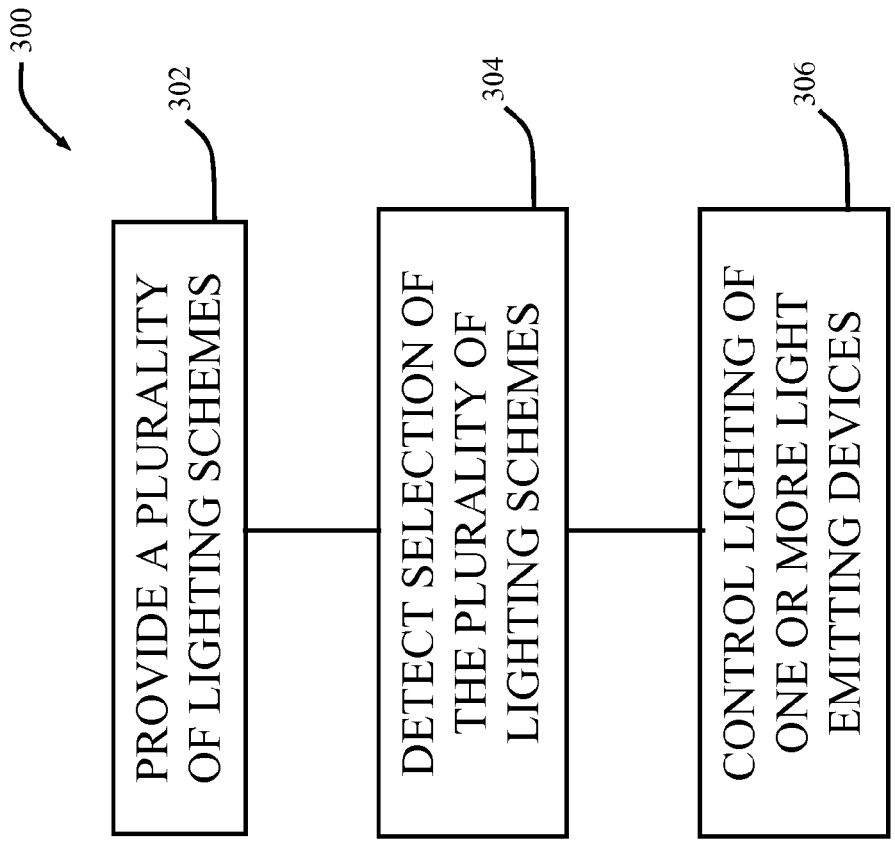

DEVICE LIGHTING APPARATUS AND METHOD

This application is a U.S. National Phase Application under 35 USC §371 of International Application No. PCT/SG2007/000285, filed Aug. 30, 2007. The foregoing application is hereby incorporated by reference in its entirety.

FIELD OF INVENTION

The invention relates generally to input devices. In particular, the invention relates to an apparatus having selectable lighting schemes.

BACKGROUND

An area lit with low ambient light provides an environment that is conducive for rest and relaxation. Some input devices for example remote controllers and keyboards are back-lighted so that a user is able to discern individual keys found on those devices under low ambient light conditions. This allows the user to utilise the input devices under low ambient light conditions for operating other devices such as televisions or computers that are controllable by the input devices.

Conventional back-lighted input devices such as the keyboards are usually illuminated with a single colour. These conventional back-lighted input devices typically provide lighting for all keys found thereon.

However, in some applications such as computer gaming, not all the keys found on the keyboards are required for playing during a game. In many instances, different keys are usually used for certain periods or sections of the game. This results in a gamer under low ambient light conditions to develop difficulties in differentiating the relevant keys that are required for play during the game.

There is therefore a need for an apparatus and method that would allow a user to differentiate usable keys found on input devices under low ambient light conditions.

SUMMARY

Embodiments of the invention disclosed herein provide an apparatus and method that would allow a user to differentiate usable keys found on input devices under low ambient light conditions.

Therefore, in accordance with a first embodiment of the invention, an apparatus is disclosed. The apparatus comprises a key operable for communicating with a computing device. The apparatus further comprises a light emitting device for lighting the key and a selector operable for selecting between a plurality of lighting schemes. More specifically, each of the plurality of lighting schemes defines at least one of colour, intensity and duration of the lighting of the key.

In accordance with a second embodiment of the invention, an apparatus is disclosed. The apparatus comprises a plurality of keys operable for communicating with a computing device. The apparatus also comprises a plurality of light emitting devices, each of the plurality of light emitting devices for lighting at least one of the plurality of keys. The apparatus further comprises a selector operable for selecting between a plurality of lighting schemes, each of the plurality of lighting schemes defining the at least one of the plurality of keys to be lit and at least one of colour, intensity and duration of the lighting of each of the at least one of the plurality of keys.

In accordance with a third embodiment of the invention, a computer implemented method is disclosed. The method involves providing a plurality of lighting schemes, each of the plurality of lighting schemes defining at least one of the plurality of keys to be lit and at least one of colour, intensity and duration of the lighting of the at least one of the plurality of keys. The method also involves detecting selection of one of the plurality of lighting schemes and controlling at least one of colour, intensity and duration of lighting of at least one of a plurality of light emitting devices to thereby control at least one of colour, intensity and duration of the lighting of each of the at least one of the plurality of keys defined by the selected one of the plurality of lighting schemes. In particular, each of the plurality of light emitting devices is for lighting a corresponding one of the plurality of keys.

In accordance with a fourth embodiment of the invention, a machine readable medium having stored therein a plurality of programming instructions is disclosed. The instructions, which when executed, cause the machine to provide a plurality of lighting schemes, each of the plurality of lighting schemes defining at least one of the plurality of keys to be lit and at least one of colour, intensity and duration of the lighting of the at least one of the plurality of keys. The instructions also cause the machine to detect selection of one of the plurality of lighting schemes and control at least one of colour, intensity and duration of lighting of at least one of a plurality of light emitting devices to thereby control at least one of colour, intensity and duration of the lighting of each of the at least one of the plurality of keys defined by the selected one of the plurality of lighting schemes. In particular, each of the plurality of light emitting devices is for lighting a corresponding one of the plurality of keys.

BRIEF DESCRIPTION OF THE DRAWINGS

Embodiments of the invention are described hereinafter with reference to the drawings, in which:

FIG. 3 is a flow diagram of a computer implemented method for allowing a user to differentiate usable keys found on input devices under low ambient light conditions according to yet another embodiment of the invention.

DETAILED DESCRIPTION

Figure 1:
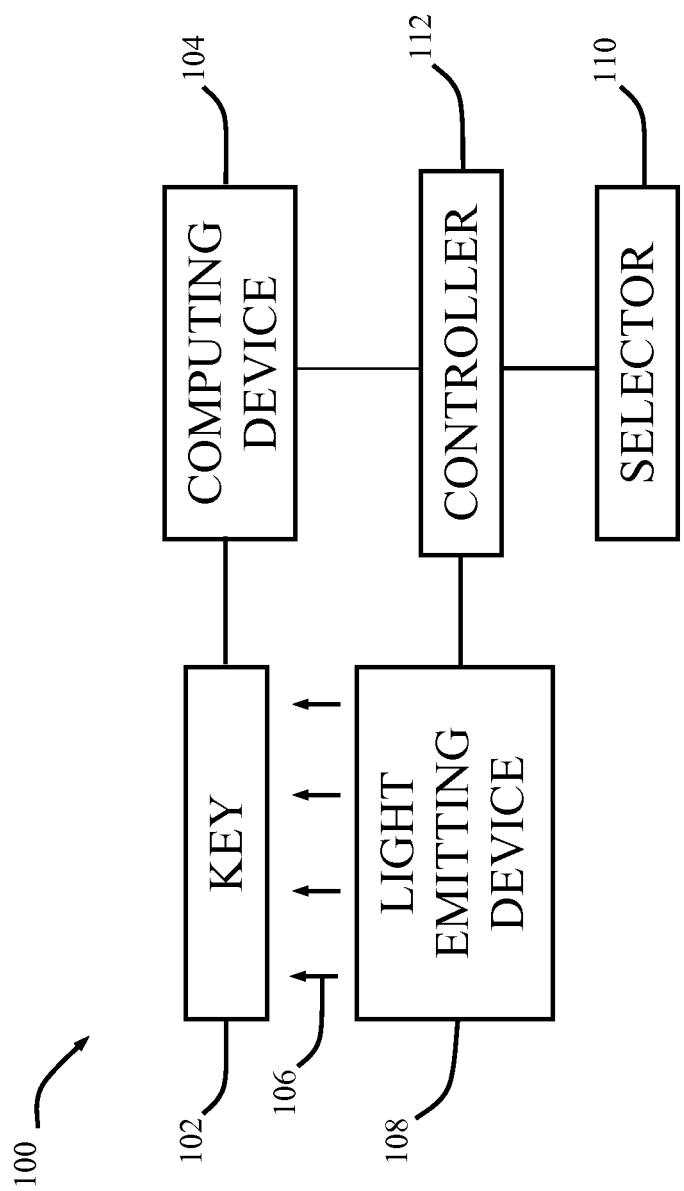
FIG. 1 is a schematic view of an apparatus for allowing a user to differentiate usable keys found on input devices under low ambient light conditions according to an embodiment of the invention.

With reference to the drawings, embodiments of the invention for providing an apparatus and method that would allow a user to differentiate usable keys found on input devices under low ambient light conditions.

Conventional back-lighted input devices typically provide lighting for all keys found thereon. However, differentiating the relevant keys that are required for use at any given instance is difficult especially under low ambient light conditions.

For purposes of brevity and clarity, the description of the invention is limited hereinafter to applications related to providing an apparatus and method that would allow a user to differentiate usable keys found on input devices under low ambient light conditions. This however does not preclude embodiments of the invention from other areas of application that facilitates differentiation of usable keys found on input devices under low ambient light conditions. The functional and operational principles upon which embodiments of the invention are based remain the same throughout the various embodiments.

Embodiments of the invention are described in greater detail hereinafter in accordance to illustrations provided in FIGS. 1 to 3 of the drawings, wherein like elements are identified with like reference numerals.

With reference to FIG. 1, a schematic view of an apparatus 100 for allowing a user to differentiate usable keys found on input devices, such as a keyboard, remote controller or telephone under low ambient light conditions is shown. In a first embodiment of the invention, the apparatus 100 comprises a key 102 that is used for communicating with a computing device 104 such as a computer. The key 102 communicates directly with the computing device 104 or via an intermediary device or peripheral. The user preferably operates the key 102 so that a signal is transmitted to the computing device 104 in order for the computing device 104 to perform a predetermined function.

Additionally, the key 102 is preferably an alphanumeric, a numeric or a command key. The apparatus 100 further comprises a light emitting device 108. Preferably, the light emitting device 108 comprises a light emitting diode (LED). Alternatively, the light emitting device 108 comprises a plurality of LEDs for generating light of different colours. This enables the light emitting device 108 to vary the colour of the light 106 emitted thereby.

The light emitting device 108 is preferably disposed within the key 102. The key 102 preferably has a portion that allows light 106 to permeate therethrough so that when the light emitting device 108 is activated to emit light 106, the light 106 is able to permeate through the portion of the key 102. In this manner, the key 102 is lighted by the light 106 emitted from the light emitting device 108.

Alternatively, the light emitting device 108 is positioned adjacent or underneath the key 102 such that the key 102 is back-lightable by the light emitting device 108.

The apparatus 100 further has a selector 110 for selecting a plurality of lighting schemes. The selector 110 is preferably a switch, a toggle or a button. Each of the lighting schemes preferably defines at least one of colour, intensity and duration of the lighting of the key 102.

The apparatus 100 preferably comprises a single chassis whereon both the selector 110 and the key 102 are positioned. For example, the selector 110 and the key 102 are formed on a single keypad, game-pad or mouse. Alternatively, the apparatus 100 comprises two chassis with each of the two chassis having one of the selector 110 and the key 102 positioned thereon. For example, the key 102 is formed on a keyboard and the selector 110 is formed on a mouse or a peripheral coupled directly to the keyboard or in data communication with the keyboard via the computing device 104.

Preferably, the apparatus 100 comprises a controller 112 that is coupled to the light emitting device 108. The controller 112 is used for receiving data signals and for translating data signals into electrical signals. The electrical signals are provided to the light emitting device 108 for lighting the light emitting device 108.

The computing device 104 preferably provides the data signals to the controller 112. The data signals contain data corresponding to the colour, intensity and duration of the lighting of the key 102. More specifically, the data signals are preferably generated by and reactive to a predetermined number of applications operating on the computing device 104.

The controller 112 comprises a processor for processing the data signals for conversion into electrical signals. The controller 112 further has a memory that is coupled to the processor for containing control instructions. The control instructions are used for controlling the processor.

Alternatively, one or more applications operating on the computing device 104 or computer provides the plurality of lighting schemes. In this instance, the plurality of lighting schemes is preferably selectable by the application. The lighting scheme is further being selected by occurrence of certain events in the application.

In an example, a game application has predefined lighting schemes relating to different game modes in a game. When the game progresses from one game mode to another, the game application selects the lighting scheme that corresponds with the current game mode for lighting the key 102. This provides a user with a visual indication of the game mode the game is currently in.

Further alternatively, the lighting schemes are definable by a user using the computing device 104. The lighting schemes defined by the user are downloadable for storage in a memory of the apparatus 100. The selector 110 is for selecting one of the lighting schemes in the memory for lighting the light emitting device 108. This enables the apparatus 100 programmed with the lighting schemes to be used with different devices without need for the lighting schemes, for example the preferred lighting schemes of a user, to be redefined when switching use of the apparatus 100 between devices.

Figure 2:
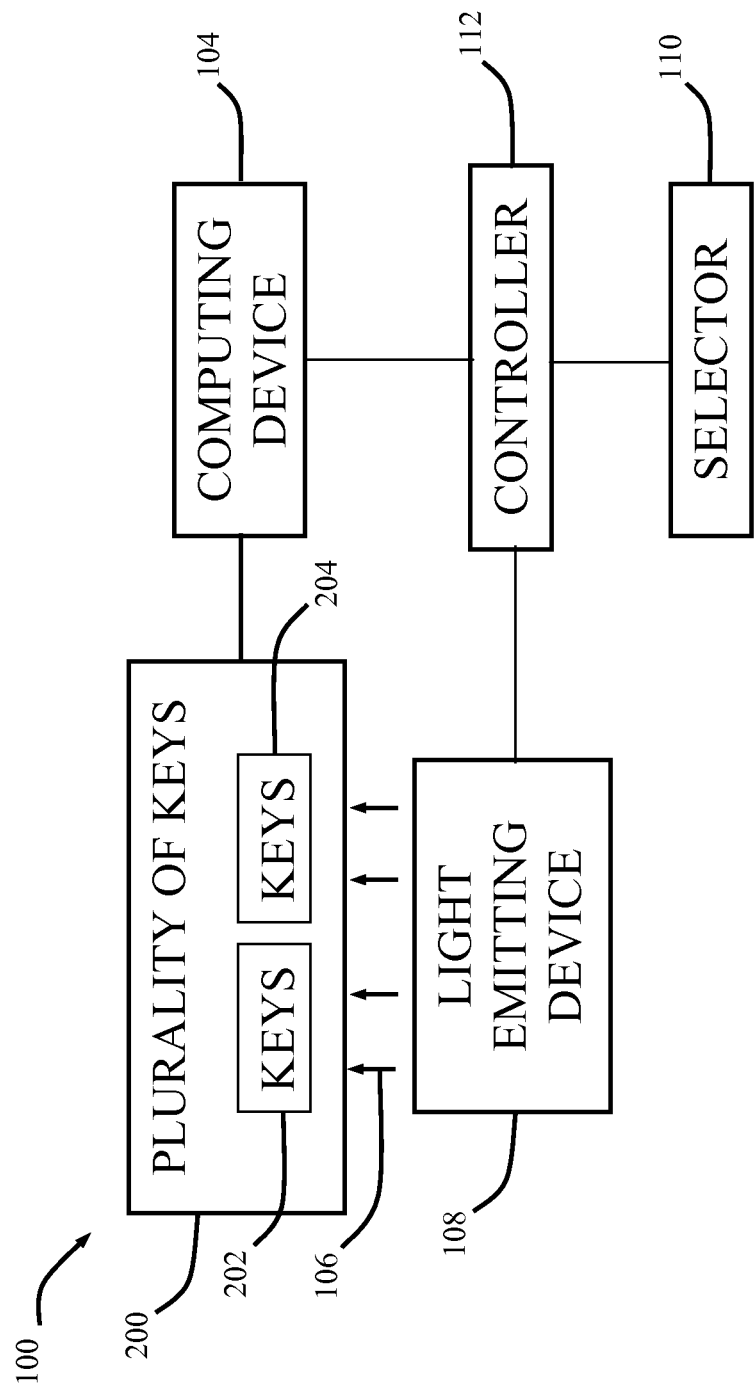
FIG. 2 is a schematic view of the apparatus of FIG. 1 for allowing a user to differentiate usable keys found on input devices under low ambient light conditions according to another embodiment of the invention.

In a second embodiment of the invention as shown in FIG. 2, each of the lighting schemes defines a plurality of keys 200 found on an input device, such as a keyboard. The plurality of keys 200 comprises one or more groups of keys 202. The lighting schemes further define the colour, intensity and duration of each group of keys 202.

Each of the lighting schemes is preferably selectable by actuating one or a combination of the keys 102. The groups of keys 202 preferably include a single deactivation button for deactivating a selected lighting scheme. Alternatively, a rotary switch is used for selecting between the lighting schemes. If only a single lighting scheme is available, a single button or dedicated buttons on the input device is preferably provided for toggling on or off the single lighting scheme.

In a game application example, during a game where the user enters into a battle, the game application sends a signal to the apparatus 100 for lighting a group of keys 202 thereon for use in an attack maneuver. Similarly, when the user is defending, the application sends another signal to the apparatus 100 to indicate another group of keys 204 found thereon for use in a defense maneuver. This is particularly advantageous for a visual-oriented user as the lighted keys 102 provide an instant guide to the appropriate keys for use in different situations during the game.

In another game application example, the input device such as a game-pad has groups of keys 202, 204 that are used for attack and defense functions during a computer battle game. In many instances, certain keys 102 in the groups of keys 202, 204 of the game-pad are used for both functions. Therefore, the apparatus 100 is advantageously used for indicating which keys 102 are available for each of the attack and defense functions. Keys 102 lighted with green light may be used for the attack function while keys 102 lighted with red light may be used for the defense function.

Alternatively, different groups of keys 202 found on the game-pad may be lighted with different colours to indicate the availability of different functions on the game-pad. The colours for indicating the availability of different functions on the game-pad are preferably programmable by the user.

In the game-pad example, the apparatus 100 is either coupled for communicating with the computing device 104 via wired or wireless means. The apparatus 100 and the computing device 104 preferably communicate via a single cable, for example with a USB connector. This provides a two-way communication between the apparatus 100 and the computing device 104.

Alternatively, the apparatus 100 is connected to the computing device 104 via one cable for the apparatus 100 to send signals to the computing device 104. The apparatus 100 is connected to the computing device 104 via another cable for the computing device 104 to send signals to the apparatus 100.

Further alternatively, the apparatus 100 is connected to the computing device 104 via a peripheral such as a keyboard or a game-pad for enabling sending of signals to the computing device 104. The apparatus 100 then receives signals from the computing device 104 either via the peripheral or directly from the computing device 104.

With reference to FIG. 3, a flow diagram of a computer implemented method 300 for allowing a user to differentiate usable keys found on input devices under low ambient light conditions is shown. The method initially involves the foregoing apparatus 100 and a step 302 of providing a plurality of lighting schemes. The lighting schemes are for defining the lighting of one or more keys 102 that are operable for communicating with a computing device or system. More specifically, each of the plurality of lighting schemes defines the colour, intensity and duration of the lighting of the one or more keys 102.

For example, when gaming, the game application allows certain keys 102 to be lighted. Based on a particular state of play during gaming, different keys 102 are lighted with different colours to enable visual cueing of available controls. The keys 102 may also be lighted with different colours for the user to react to different events in the game application.

The method 300 then involves a step 304 of detecting selection of one of the plurality of lighting schemes. The selection of the plurality of lighting schemes is preferably provided by an application, such as a game application operating on the computing system and is preferably in response to an event occurring in the game application.

The method 300 subsequently involves a step 306 of controlling one or more of colour, intensity and duration of lighting of at least one of a plurality of light emitting devices 108. This step 306 controls the colour, intensity and duration of the lighting of the one or more keys 102 according to the selected one of the plurality of lighting schemes. More specifically, each of the plurality of light emitting devices 108 is for lighting a corresponding one of the one or more keys 102.

The foregoing method 300 is executable in a machine, such as the computing device 104 or computer of FIG. 1. The method 300 may be implemented as instructions or routines that may be executed by one or more execution units, such as the processor, within the computing device 104 or computer. These machine executable instructions may be stored using any machine readable storage medium, such as an internal memory, as well as various external or remote memories, such as a hard drive, diskette, CD-ROM, magnetic tape, digital video or versatile disk (DVD), laser disk, flash memory, a server on a network, etc.

These machine executable instructions may also be stored in various propagated signals, such as wireless transmissions from a server to a client. In one implementation, these software routines can be written in the C programming language. It is to be appreciated, however, that these routines may be implemented in any of a wide variety of programming languages.

In the foregoing manner, an apparatus for providing an apparatus and method that would allow a user to differentiate usable keys found on input devices under low ambient light conditions is disclosed. Although only a few embodiments of the invention are disclosed, it becomes apparent to one skilled in the art in view of this disclosure that numerous changes and/or modification can be made without departing from the scope and sprit of the invention.

The invention claimed is:

1. A peripheral input device, for communicating with a computing device, comprising:
    a plurality of keys operable for communicating with the computing device;
    a plurality of light emitting devices for lighting each of the plurality of keys; and
    a selector operable for selecting between a plurality of lighting schemes, each of the plurality of lighting schemes defining at least one of colour, intensity and duration of the lighting of a predetermined group of keys which are usable in accordance with a corresponding mode of an application running on the computing device.

2. The apparatus as in claim 1, wherein lighting one of the plurality of keys comprises at least one of back-lighting the key and permeating light through at least a portion of the key.

3. The apparatus as in claim 1, the selector being one of a switch, a rotary switch, a toggle and a button.

4. The apparatus as in claim 1, each of the plurality of light emitting devices comprising at least one light emitting diode (LED).

5. The apparatus as in claim 1, each of the plurality of keys being at least one of an alphanumeric, a numeric and a command key.

6. The apparatus as in claim 1, the plurality of lighting schemes being provided by an application operating on the computing device.

7. The apparatus as in claim 1, the plurality of lighting schemes further being selectable by an application operating on the computing system.

8. The apparatus as in claim 1, further comprising:
    a controller coupled to the plurality of light emitting devices, the controller for receiving data signals and for translating the data signals into electrical signals for the lighting of the plurality of light emitting devices.

9. The apparatus as in claim 8, the data signals being provided by the computing device to the controller.

10. The apparatus as in claim 8, the data signals containing data corresponding to at least one of the colour, intensity and duration of the lighting of the plurality of keys.

11. The apparatus as in claim 8, the data corresponding to at least one of the colour, intensity and duration of the lighting of the plurality of keys being generated by and reactive to at least one application operating on the computing device.

12. The apparatus as in claim 8, the controller comprising:
    a processor for processing the data signals for conversion into the electrical signals; and
    a memory coupled to the processor for containing control instructions for controlling the processor.

13. A computer implemented method of controlling a peripheral input device comprising a plurality of keys operable for communication with a computing device and a plurality of light emitting devices for lighting each of the plurality of keys, the method comprising:
    providing a plurality of lighting schemes, each of the plurality of lighting schemes defining at least one of colour, intensity and duration of the lighting of a predetermined group of keys which are usable in accordance with a corresponding mode of an application running on the computing device;

selecting one of the plurality of lighting schemes with a selector on the peripheral input device; and controlling at least one of colour, intensity and duration of the lighting of the predetermined group of keys defined by the selected one of the plurality of lighting schemes, to highlight keys which are usable in accordance with a corresponding mode of the application.

14. The method as in claim 13, controlling at least one of colour, intensity and duration of lighting of the predetermined group of keys comprising:

at least one of back-lighting and permeating light through at least a portion of each of the group of keys.

15. The method as in claim 13, each of the plurality of light emitting devices comprising at least one light emitting diode (LED).

16. The method as in claim 13, each of the plurality of keys being at least one of an alphanumeric, a numeric and a command key.

17. The method as in claim 13, the plurality of lighting schemes being provided by an application operating on the computing device.

18. The method as in claim 13, selecting one of the plurality of lighting schemes comprising:

selecting one of the plurality of lighting schemes with an application operating on the computing device.

19. The method as in claim 13, controlling at least one of colour, intensity and duration of lighting of the predetermined group of keys defined by the selected one of the plurality of lighting schemes comprising:

generating data signals based on the selected one of the plurality of lighting schemes;

translating the data signals into electrical signals with a controller, the controller being coupled to the plurality of light emitting devices; and providing the electrical signals to the light emitting devices corresponding to the predetermined group of keys defined by the selected one of the plurality of lighting schemes to thereby control the at least one of colour, intensity and duration of lighting of the predetermined group of keys defined by the selected one of the plurality of lighting schemes.

20. A non-transitory machine readable medium having stored therein a plurality of programming instructions for a method of controlling a peripheral input device comprising a plurality of keys operable for communication with a computing device and a plurality of light emitting devices for lighting each of the plurality of keys, which when executed, the instructions cause the machine to:

provide a plurality of lighting schemes, each of the plurality of lighting schemes defining at least one of colour, intensity and duration of the lighting of a predetermined group of keys which are usable in accordance with a corresponding mode of an application running on the computing device;

select one of the plurality of lighting schemes; and control at least one of colour, intensity and duration of the lighting of the predetermined group of keys defined by the selected one of the plurality of lighting schemes, to highlight keys which are usable in accordance with a corresponding mode of the application.

21. The non-transitory machine readable medium as in claim 20, wherein the plurality of programming instructions, which when executed, the instructions cause the machine to:

at least one of back-light and permeate light through at least a portion of each of the group of keys.

22. The non-transitory machine readable medium as in claim 20, wherein each of the plurality of light emitting devices comprises at least one light emitting diode (LED).

23. The non-transitory machine readable medium as in claim 20, wherein each of the plurality of keys is at least one of an alphanumeric, a numeric and a command key.

24. The non-transitory machine readable medium as in claim 20, wherein the plurality of lighting schemes is provided by an application operating on the computing device.

25. The non-transitory machine readable medium as in claim 20, wherein the plurality of programming instructions, which when executed, the instructions cause the machine to:

select one the plurality of lighting schemes with an application operating on a computing system.

26. The non-transitory machine readable medium as in claim 20, wherein the plurality of programming instructions, which when executed, the instructions cause the machine to:

generate data signals based on the selected one of the plurality of lighting schemes;

translate the data signals into electrical signals with a controller, the controller being coupled to the plurality of light emitting devices; and provide the electrical signals to the light emitting devices corresponding to the predetermined group of keys defined by the selected one of the plurality of lighting schemes to thereby control the at least one of colour, intensity and duration of lighting of the predetermined group of keys defined by the selected one of the plurality of lighting schemes.

* * * * *